Sept. 13, 1932.  G. H. COLE ET AL  1,877,558

SOUND PRODUCING DEVICE

Filed July 22, 1929

INVENTOR
Jurjen S. High &
Guerney H. Cole.
BY
ATTORNEY

Patented Sept. 13, 1932

1,877,558

UNITED STATES PATENT OFFICE

GUERNEY H. COLE AND JURJEN S. HIGH, OF WILKINSBURG, PENNSYLVANIA, ASSIGNORS TO WESTINGHOUSE ELECTRIC & MANUFACTURING COMPANY, A CORPORATION OF PENNSYLVANIA

SOUND PRODUCING DEVICE

Application filed July 22, 1929. Serial No. 380,129.

Our invention relates to sound-producing devices, such as loud-speakers, and it has particular relation to coupling-elements designed and intended for the purpose of transferring motion from an electrically actuated driving member, or motor, to a driven element such as a diaphragm.

During the course of extensive experiments and research, in connection with the design of loud-speakers, we have established the fact that the unsatisfactory operation of many loud-speakers, of commercial types, may be ascribed, in part, to the use of improperly designed coupling-devices. Many of the coupling devices now being used cause distortion of the sounds being reproduced, largely because of the introduction of harmonic frequencies, at the natural periods of the constituent elements of the said devices, and by the over-emphasis of high frequencies.

Various, more or less complicated, connector-rod and lever combinations have been devised for transmitting motion between the motor of a loud-speaker and the sound-radiating diaphragm thereof, including bell-crank devices and resilient "grasshoppers", as they are known to those skilled in the art. Coupling devices of the types exemplified by the patents to J. S. High, Nos. 1,702,437 and 1,715,705 are also being used and attention is called to those patents for the purpose of illustrating certain of the angles from which the coupling-device problem has been attacked.

In many instances the use of complicated coupling devices is entirely justifiable, particularly when they are so designed as to introduce a distorting effect that minimizes a distortion of opposite nature that tends to appear in the sound-output from the loud-speaker. Recently, however, the characteristics of conical diaphragms, such as are generally employed, have been so improved by the addition of circumferential corrugations, by modifications of the conical shape and by proper choice of the diaphragm-material, itself, that partial vibrations have been substantially eliminated. Such being the case, the distortion introduced by massive coupling devices, as heretofore constructed, when used in connection with the improved diaphragms, is decidedly detrimental.

It is, accordingly, an object of our invention to provide a coupling-device that shall cause minimum distortion.

Another object of our invention is to provide a coupling device that shall have minimum mass.

Another object of our invention is to provide a coupling-device that shall have substantially no natural period of vibration of its own.

Another object of our invention is to provide a coupling device that shall function, as a mechanical filter, to absorb and damp out vibrations at very high frequencies such as are occasioned by non-uniform vibration of the loud-speaker motor, or by the over-accentuated response of a pick-up device, in an electrical phonograph, to vibrations at some one of its natural periods, or by the phenomenon known as "needle-scratch."

Another object of our invention is to provide a substantially self-adjusting coupling-device, whereby the process of alignment of the motor and the diaphragm shall be simplified.

Another object of our invention is to provide a coupling device that shall, by reason of its structure and characteristics, function to eliminate abrupt physical discontinuities in the chain of mechanism interposed between a loud-speaker and a diaphragm associated therewith.

Another object of our invention is to provide a coupling-device that shall have minimum reflective characteristics, insofar as sound-frequencies transmitted thereby, are concerned.

Another object of our invention is to provide a coupling device of such character that it shall be capable of being firmly and permanently united to a diaphragm.

Another, and more specific, object of our invention, is to provide a coupling device that shall be reliable, simple in construction, and inexpensive to manufacture.

A coupling-device constructed according to our invention, and by which we attain the aforementioned objects, comprises a plug, or cap, of highly damping material of low specific-gravity, such as balsa-wood, molded cork composition, or the like. The plug is fitted within the truncated apex of a conical diaphragm, or the cap is disposed around the exterior of the apex thereof, and cemented firmly to the cone-material. The grain of the balsa-wood, preferably, is disposed axially of the cone in order to obtain maximum internal damping at very high frequencies.

We prefer to connect the coupling device to the armature of a loud-speaker motor through an element having axial stiffness, which element extends through an opening in the coupling device and is cemented thereto.

The novel features that we consider characteristic of our invention are set forth with particularity in the appended claim. The invention itself, however, both as to its organization and its method of operation, together with additional objects and advantages thereof, will best be understood from the following description of a specific embodiment, when read in connection with the accompanying drawing, in which:

Figure 1:
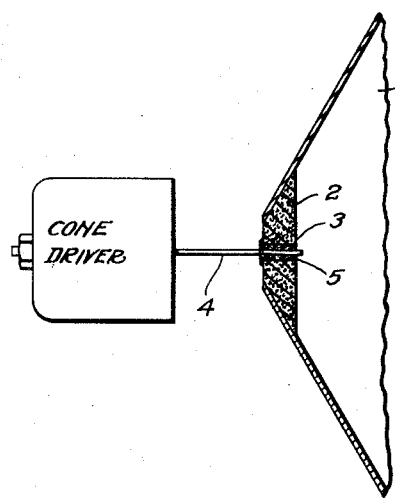
Figure 1 is a view, in vertical cross-section, of a portion of a conical diaphragm comprising one embodiment of our invention.

The apparatus illustrated in Fig. 1 comprises a conical diaphragm 1, within the truncated apex of which is disposed a conical coupling-device 2 constructed of cork, balsa-wood or a material having characteristics similar thereto. The coupling-device has an axial opening 3, within which is disposed a connecting rod 4. The end of the rod which extends through the coupling device is surrounded by a mass 5 of solidified cementing material, or the like. The projecting end of the connecting rod may be soldered or otherwise firmly affixed to the vibratory element of a loud speaker motor, or to the analogous element of a telephone transmitter (not shown).

The inner end of the connecting rod, which is surrounded by the cement, may be roughened or threaded to provide a more reliable anchor.

During the process of assembling a loud-speaker, or a telephone transmitter, comprising our improved coupling device, the diaphragm and the electromagnetic elements may be separately mounted and adjusted to their permanent positions before the cement is inserted between the coupling-device and the actuating rod. By using a cement which "sets" rather slowly, all danger of strain between the connecting rod and the coupling-device is avoided. Furthermore, even if the cone and the electromagnetic element depart from alignment during use, the resiliency of the coupling-device is such that no strains will be imposed upon the diaphragm or the said electromagnetic element.

If the coupling-device is made of balsa-wood, I have found it advantageous to so arrange it that the grain of the wood is coaxial with the cone and the connecting rod.

The connecting element is affixed to the inner surface of the apex of the cone by using any reliable cement.

The connecting rod 4 need not be a plain element, such as illustrated in the drawing, but may be constructed, if desired, according to the disclosure in the High Patent No. 1,702,437, or it may be constituted by a wire maintained in a state of tension by a surrounding rubber bushing, as shown in the High Patent No. 1,715,705.

During the course of experiments conducted with a loud-speaker comprising the embodiment of our invention illustrated in Fig. 1, it was discovered that the high-frequency response of the cone was largely determined by the amount removed from the apex thereof. In other words, the response of the cone to the higher frequencies became less and less as a greater proportion of the apex was removed. This indicated to us that our invention would enable a very satisfactory control of the overall high-frequency response of a conical diaphragm.

Figure 2:
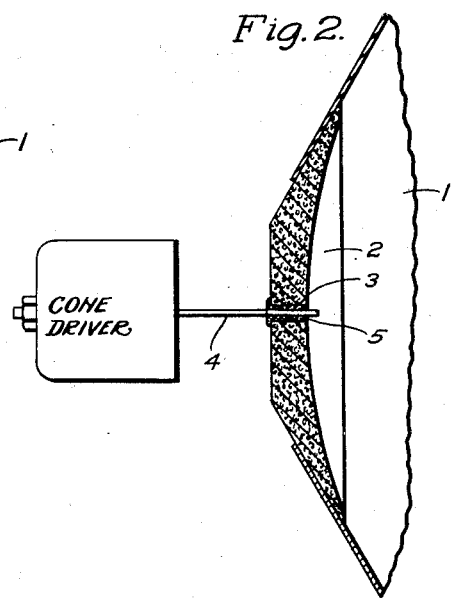
Fig. 2 is a similar view illustrating a modified coupling device.

In Fig. 2 is shown a portion of a modified diaphragm, a large portion of the apex of which has been removed, and in which a relatively large coupling-device of balsa-wood or similar material has been substituted for the said removed portion.

Furthermore, we find it desirable to so construct the large coupling-device that the perimeter thereof is much thinner than the middle portion through which extends the connecting rod, thus preventing, in large measure, the occurrence of reflections at the junction between the coupling-device and the diaphragm.

Figure 3:
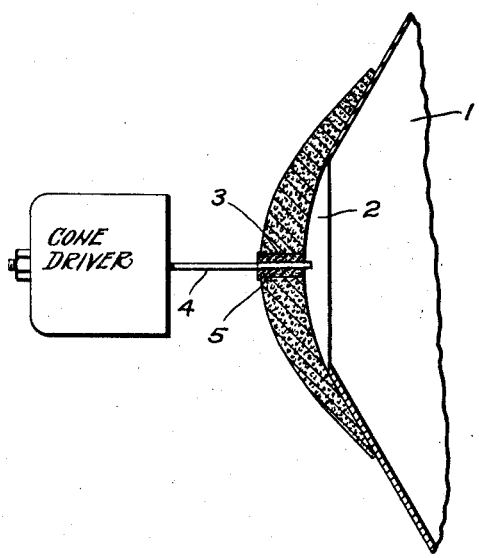
Fig. 3 is a view, in vertical cross-section, of a portion of a conical diaphragm equipped with an alternative embodiment of our invention.

In some instances, it may be desirable to dispose the coupling device exteriorly of the apex of the cone instead of interiorly as shown in Figs. 1 and 2. This modification of our invention is illustrated in Fig. 3, wherein the elements corresponding to those in Figs. 1 and 2 are similarly numbered.

Figure 4:
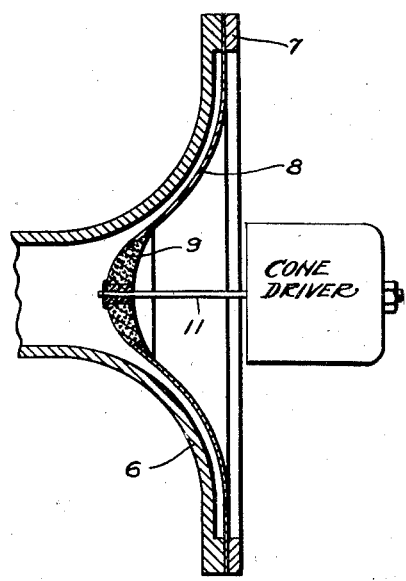
Fig. 4 is a view, in vertical cross-section, illustrating the application of our invention to a phonograph sound-box or to a loud-speaker of the horn type.

Our invention is also applicable to phonograph sound-boxes and to loud speakers of the horn type. As illustrated in Fig. 4, such a device may comprise a casing 6 which flares outwardly into a horn (not shown), a retaining ring 7 and a diaphragm 8 clamped between the lower end of the casing and the said retaining ring. The diaphragm is provided with a coupling device 9 constructed according to our invention, through the center of which extends a connecting rod 11. The connecting rod may be affixed by soldering, or otherwise, to an electromagnetic driving element (not shown).

In the operation of a loud speaker or a telephone transmitter comprising our improved coupling device, it is noted that the action of the said device seems somewhat paradoxical. In other words, it would be thought, from an investigation of the characteristics of balsa-wood, compressed cork and analogous materials, that the high frequencies necessary to the proper rendition of musical selections would not be transmitted thereby either to or from the diaphragm. Such is not the case, however, it having been determined that only the ultra high frequencies, are damped out, such, for example, as those frequencies introduced by "needle-scratch" when the device is comprised in a loud speaker actuated from an amplifier which, in turn, is connected to an electromagnetic pick-up device for phonograph record translation. For such ultra high frequencies, our improved coupling device seems to have a selective damping action, that is, it will transmit, in a thoroughly satisfactory manner, all of the necessary frequencies while damping out, to some extent, the scratch frequencies and frequencies of non-periodic character.

In short, our improved coupling device enables, in electric phonographs, the elimination of the electrical "scratch frequency filter" which has heretofore been considered a necessary adjunct thereto.

Our improved connecting device is, furthermore, very advantageous in that, inasmuch as it has no pronounced natural period of its own within the audio range, being substantially aperiodic in its action, it does not introduce any distortion into the sound reproduction, such as is introduced by the use of coupling devices of the types hereinbefore referred to.

Although we are not prepared at this time to so state conclusively, it is our belief that our improved connecting device functions by reason of a phenomenon which, for lack of a better term, may be designated as "molecular friction". At any rate, it absorbs, by its inherent damping characteristics, the high frequency peak energy occasioned by non-uniform response of the several vibratory systems which may be employed in an electromagnetic pick-up, a telephone transmitter, or in a loud speaker.

Another important advantage of our improved coupling device lies in its very slight mass, since, as is well known, balsa-wood has a specific gravity of approximately 0.12 to 0.2, while cork has a specific gravity of about 0.22 to 0.26. It is therefore, possible to truncate a cone to any desired degree, to control its response, and to thereafter add a large coupling-device without appreciably increasing the load imposed upon a loud speaker motor.

Although we have chosen certain specific embodiments of our invention for purposes of illustration and description, many modifications thereof will be suggested to those skilled in the art to which it pertains. Our invention, therefore, is not to be limited except insofar as is necessitated by the prior art or by the spirit of the appended claim.

We claim as our invention:

In combination, a truncated conical diaphragm, a coupling element of vibration-absorbing material affixed thereto in lieu of the apex thereof, a driver, a connecting rod extending between said driver and said coupling element and means comprising a cementitious binder for joining said connecting rod to said coupling element.

In testimony whereof, we have hereunto subscribed our names this 16th day of July, 1929.

GUERNEY H. COLE.
JURJEN S. HIGH.